Dec. 4, 1962                 M. E. AMBLARD ETAL                 3,066,944
                         HIGH PRESSURE METALLIC PACKING
                              Filed Jan. 29, 1960
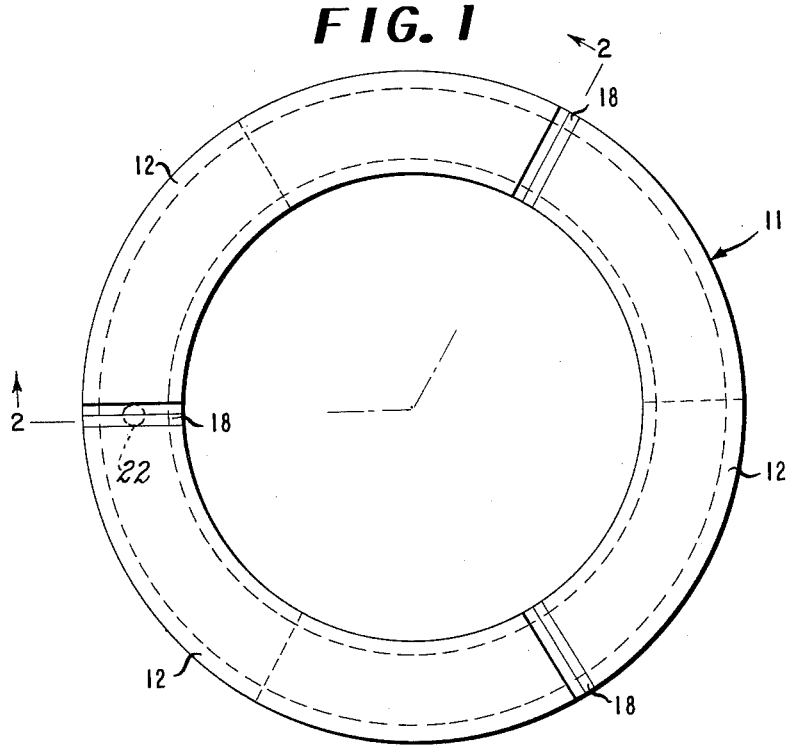
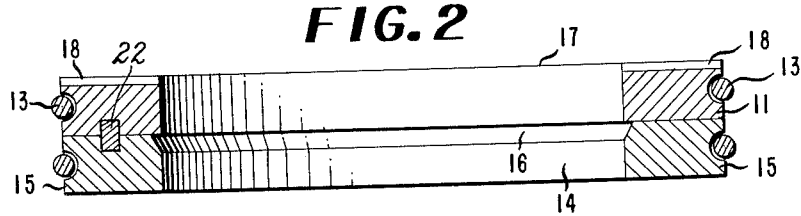
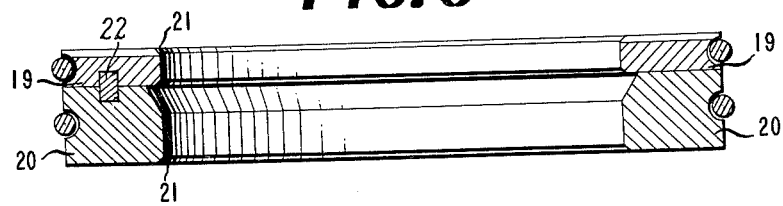
INVENTORS
MARCEL EUGENE AMBLARD
RAYMOND HARRY CARNELLY
BY
ATTORNEY

United States Patent Office 3,066,944
Patented Dec. 4, 1962

3,066,944
HIGH PRESSURE METALLIC PACKING
Marcel Eugene Amblard, Charleston, W. Va., and Raymond Harry Carnelly, Orange, Tex., assignors to E. I. du Pont de Nemours and Company, Wilmington, Del., a corporation of Delaware
Filed Jan. 29, 1960, Ser. No. 5,460
2 Claims. (Cl. 277—156)

This invention relates to an improvement in high pressure metallic packing and more specifically to a metallic packing suitable for sealing reciprocating shafts operating under high pressure.

Metallic packings are well known in the art. While many of these packings are suitable for use at moderate pressures, they have limitations which prevent them from being useful under high pressures. Several schemes have been proposed to overcome the difficulties encountered in adapting presently available packing to high pressures. One such scheme involves using several packing elements in series to distribute the pressure load. While this scheme is effective to some extent, it generally fails due to pressure build-up on a single element.

It is an object of this invention to provide a packing suitable for sealing reciprocating shafts operating under high pressures. It is another object of this invention to provide a packing which is not susceptible to oil lock. It is a further object of this invention to provide high pressure packing which is long wearing.

The objects of this invention are accomplished by a metallic packing which comprises at least one pair of segmented cylindrical metal collars, spaced coaxially about and contiguous to a reciprocating shaft and each other, the upstream collar facing the high pressure being radially fixed with respect to the downstream collar by a detachable means; a portion of the inner-cylindrical surface of said downstream collar being beveled to increase the clearance with said shaft at the high pressure side of said collar; a portion of the upstream face of said upstream collar being grooved to form a duct suitable for transmitting lubricating fluid from the outer cylindrical surface of said collars to the surface of said shaft; said collars consisting of three equal contiguous segments; the joints formed by said segments being on an axial plane of said shaft; said joints on the upstream collar being positioned between the joints of the downstream collar. In accordance with the present invention it was discovered that under high pressure the instant packing provided a particularly effective seal and had much better wearing characteristics than packing presently commercially available.

A preferred embodiment of the invention is illustrated in the accompanying drawings in which FIGURE 1 is an elevation of the packing viewed from the high pressure side and FIGURE 2 is a section through line 2—2 in FIGURE 1. FIGURE 3 illustrates still another preferred embodiment.

In the embodiment illustrated by FIGURE 1 and FIGURE 2, the upstream collar 11 which faces the high pressure is made up of three equal segments 12 which are held contiguous by the spring 13. Other means may be used to hold the segments contiguous if desired. In some cases, it is possible to make use of the pressure to hold the segments 12 contiguous. In some applications, it is possible to make use of unsegmented collars. Use of the unsegmented collars however, requires that the clearance between the shaft and the collar be machined with high precision. In general, clearances of .0005 to .0030 are most suitable. The upstream face 17 of the upstream collar 11 has V-shaped grooves 18 which form ducts suitable for transmitting lubricating fluid from the outer-cylindrical surface of the collars to the surface of the shaft (not shown). The downstream collar 15 is beveled 16 to increase the clearance with the shaft. The bevel 16 aids lubrication of the shaft and decreases the total loading on the downstream collar 15. By properly adjusting the ratio of the beveled area 16 to the inner cylindrical surface 14, the loading on the inner-cylindrical surface 14 can be adjusted, within limits, to the value desired. In other respects the downstream collar 15 is identical to the upstream collar 11 except the downstream collar 15 does not have a groove 18 for conducting lubricating oil.

The purpose of the upstream collar 11 is to cover the joints formed by the segments in the downstream collar 15. If the joints in the downstream collar 15 are machined with sufficient precision so that fluids will not flow between the segments, the upstream collar 11 need not be used. When an upstream collar 11 is used, the joints on the upstream collar 11 are positioned between the joints of the downstream collar 15. In a preferred embodiment, the position of the upstream collar 11 is radially fixed with respect to the downstream collar 15 by means of a detachable attachment, suitably a pin or key 22.

Another preferred embodiment of the present invention is shown in FIGURE 3 which is a section of a packing similar to the packing shown in FIGURE 2. In this embodiment the upstream collar 19, facing the high pressure, is reduced in thickness relative to the downstream collar 20. The edges of inner-cylindrical surface of the upstream collar 19 and the downstream collar 20 are beveled or rounded 21 to remove the sharp corners thereby permitting better flow of the lubricating fluid between the inner-cylindrical surface of the collars and the shaft.

In general, the surfaces of the collars which contact each other, the packing case (not shown) or the shaft, should be machined to a smooth finish to insure a full seal between all sealing surfaces. When installed, the clearance between the shaft and the inner-cylindrical surfaces should be .000 to .001 inch. The packing will subsequently wear-in to the best clearance. The packing of this invention does not grip the shaft since the collars are free to expand but cannot contract. This permits the packing to have a much longer life than the packing of the prior art which typically have tangential cuts or radial gaps which permit the packing to grip the shaft under the high pressures. The packing of this invention can be successfully used to seal off pressures of 30,000 p.s.i. or higher.

It should be understood that the foregoing illustration is merely a preferred embodiment of the invention and many modifications will be apparent to those skilled in the art.

The packing of this invention lends new economies to the operation of high pressure equipment by increasing the utilization of the equipment.

We claim:
1. A metallic high pressure packing suitable for sealing a reciprocating shaft which comprises at least one pair of segmented cylindrical metal collars, spaced coaxially about and contiguous to said shaft and each other, the upstream collar facing the high pressure being radially fixed with respect to the downstream collar by a detachable means; a portion of the inner-cylindrical surface of said downstream collar being beveled to increase the clearance with said shaft at the high pressure side of said collar; a portion of the upstream face of said upstream collar being grooved to form at least one duct suitable for transmitting lubricating fluid from the outer-cylindrical surface of said collars to the surface of said shaft; said collars consisting of three equal contiguous segments; the joints formed by said segments being radial and on an axial plane of said shaft; said joints on the upstream collar being positioned between the joints of the downstream collar.

2. A metallic high pressure packing suitable for sealing a reciprocating shaft which comprises at least one pair of segmented cylindrical metal collars, each collar in combination with a circular spring; said metal collars being spaced coaxially about and contiguous to said shaft and each other; the upstream collar facing the high pressure being radially fixed with respect to the downstream collar by a detachable means; a portion of the inner-cylindrical surface of said downstream collar being beveled to increase the clearance with said shaft at the high pressure side of said collar; a portion of the high pressure side of said upstream collar being grooved to form at least one duct suitable for transmitting lubricating fluid from the outer-cylindrical surface of said collars to the surface of said shaft; the outer-cylindrical surface of said collars being grooved to receive a spring; said collars consisting of three equal segments held contiguous by said circular spring; the joints formed by said segments being radial and on an axial plane of said shaft; said joints on the upstream collar being positioned between the joints on the downstream collar.

References Cited in the file of this patent
UNITED STATES PATENTS

| | | |
|---|---|---|
| 368,916 | Foss | Aug. 23, 1887 |
| 774,490 | Paine | Nov. 8, 1904 |
| 1,273,634 | London | July 23, 1918 |
| 1,946,677 | Fall | Feb. 13, 1934 |
| 2,208,976 | Halfpenny | July 23, 1940 |
| 2,249,679 | Basham | July 15, 1941 |